July 23, 1940. G. A. TINNERMAN 2,208,779
FASTENING DEVICE
Original Filed Oct. 14, 1936
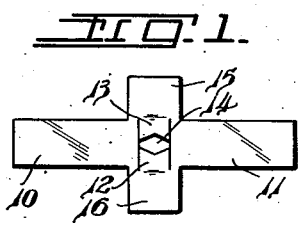
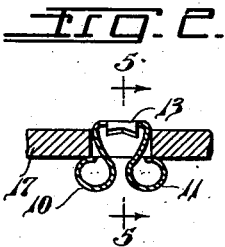
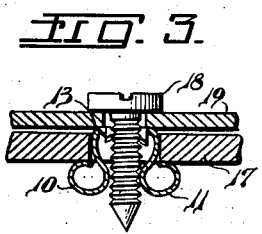
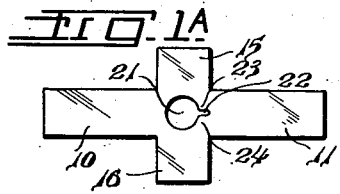
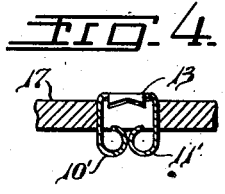
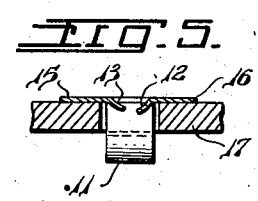
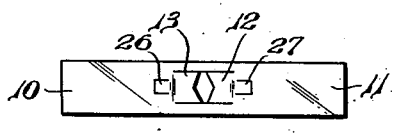
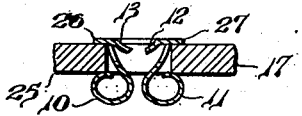
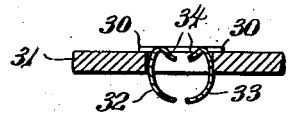
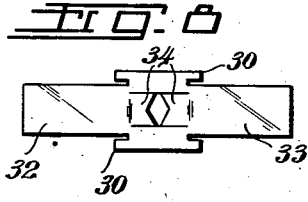
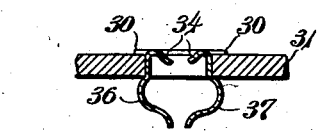
Inventor
GEORGE A. TINNERMAN
By H. G. Lombard
Attorney Patented July 23, 1940

2,208,779

UNITED STATES PATENT OFFICE 2,208,779

FASTENING DEVICE

George A. Tinnerman, Rocky River, Ohio, assignor, by mesne assignments, to Tinnerman Products, Inc., Cleveland, Ohio, a corporation of Ohio Original application October 14, 1936, Serial No. 105,502, now Patent No. 2,184,783, dated December 26, 1939. Divided and this application July 24, 1939, Serial No. 286,295

11 Claims. (Cl. 85—2.4)

This invention deals with fastening devices designed to be used with a bolt or screw fastening for connecting two parts together and relates, more particularly, to such fastening devices as adapted for use in those locations where only one side of a part to be joined is accessible for making a connection. The present application is a division of copending application Serial Number 105,502 filed October 14, 1936 and since issued as Patent Number 2,184,783, December 26, 1939.

An object of the present invention is to make a fastener which may be inserted in a bolt receiving aperture from the same side of the part to be joined from which the bolt is intended to be introduced, and in addition to provide a fastener of this character which will remain automatically in bolt-receiving position. In this relation, the invention contemplates a fastener which may be attached readily to one article, and which will remain in self-sustaining, bolt-receiving position upon the article during the time the article is being fitted into place with respect to another article preparatory to the application of the bolt through the fastener and tightened thereagainst to secure the articles in assembled relation. In some instances, the fastener is intended not only to remain in self-sustaining position upon the article, but also to act as a supporting member for holding the second article in assembled position until the bolt is inserted therethrough.

Further objects and advantages and other new and useful features in construction, operation and use of the fastening devices of the invention will be readily apparent to those skilled in the art as a description thereof proceeds with reference to the accompanying drawing in which like reference characters designate like parts throughout, and in which:

Figs. 1 to 3 inclusive illustrate one form of the fastening device wherein Fig. 1 is a top plan view of a blank of which the fastener may be made;

Fig. 2 is a vertical section taken through the fastener after the forming operation has been completed;

Fig. 3 is a section taken through the fastener and the articles that are to be joined together, showing the position of the fastener after a bolt has been inserted therethrough and drawn tightly thereagainst;

Fig. 1A is a top plan view of a blank similar to Fig. 1 with a modified form of thread engaging means;

Fig. 4 is a vertical section through a fastener, illustrating a modification of the arm construction of the fastener shown in Figs. 2 and 3;

Fig. 5 is a vertical section through the fastener shown in Fig. 2 taken on a plane indicated by line 5—5;

Figs. 6 and 7 illustrate a further modification of the fastener, wherein Fig. 6 is a top plan view of a blank, and Fig. 7 illustrates a vertical section through a formed fastener; and, Figs. 8 to 11 inclusive illustrate further modifications of the fastener wherein Fig. 8 is a top plan view of a blank and Figs. 9 to 11 inclusive are vertical sections illustrating various leg constructions employed in different forms of the fastener.

The various forms which the invention may take have a feature that is common to all of them. Such feature comprises expansible portions, which engage in the bolt opening in the part to be joined, or one or more places of the part to be joined, and the tension of the fastener in bolt receiving position taking place by means of the expansible characteristics of the metal of which the fastener is made. The expansible feature enables the fastener to be pushed into fastening position from the same side of the part from which the bolt is inserted such that the connection may be made by an operation taking place entirely from one side of the articles that are to be joined together. By varying the sizes and shape of the expansible portions, the fastener may be formed for use on parts of variable thickness, wherefore one size of the fastener is adapted to fit into many different assemblies, thus obviating the necessity for making a specific size for each assembly, as has been the practice of previous forms of self-positioning fasteners.

Referring now to the drawing in detail, the blank as shown in Fig. 1 comprises a section of sheet metal having two or more arms 10 and 11 providing the expansible portions of the device; adjacent the junction of the arms, bolt-thread engaging means are stamped from the metal body and in the form illustrated in Fig. 1, such means comprise opposing tongues 12 and 13 which are yieldable with reference to the remaining portion of metal, and which have an opening 14 therebetween for receiving a shank of a bolt, or other fastener.

The blank otherwise is preferably provided in the manner of a substantially cross-shaped sheet metal section including flanges 15, 16 as shown in Fig. 1. The arms 10, 11, comprising the expansible portions of the device, are bent downwardly and outwardly in the same general direction in which the tongues 12, 13 are formed as best seen in Fig. 2, the bend occurring adjacent the innermost ends of the arms so as to provide a substantial receptacle into which the bolt may be inserted. Said arms 10, 11 are formed in such relationship to the size of the opening in the part 17 to be joined that the normal tendency of the arms to spread is to hold the fastener in self-sustained, bolt receiving position upon the part. In this relation, inasmuch as the arms 10, 11 are bent downwardly and outwardly, the end portions thereof present substantial shoulders which engage the underface of such part in substantial snap fastening engagement therewith while the flanges 15, 16, rest upon the top surface of the part, thereby limiting the inward movement of the fastener thus applied to fastening position on said part.

Thus when a bolt is inserted through an opening in a part 19 to be connected and passed through the fastener as shown in Fig. 3, the shank of the bolt forces the arms 10, 11 outwardly and into firm engagement with the underface of the part 17, while the yieldable bolt thread engaging means 12, 13, Fig. 1, grip the thread of the bolt and thereby securely hold it in place. In the modification of Fig. 4, the arms 10', 11' extend downwardly and inwardly, instead of downwardly and outwardly, as in the form illustrated in Figs. 2 and 3, but the locking action incident to the application of the bolt fastening is substantially the same.

In the modification of Fig. 1A, the fastener blank has the same parts as those illustrated in Fig. 1, which are correspondingly made, except for the fact that the thread engaging portion comprises a circular aperture 21, which has a slot 22 extending therefrom. The slot thereby provides substantial tongues 23 and 24, which may be bent out of the plane of the blank until the marginal edge of the aperture 21 is caused to conform to the helix of the bolt thread for uniform threaded engagement therewith.

The modification illustrated in Figs. 6 and 7 is similar to that illustrated in Figs. 1 to 3 inclusive except for the fact that the blank is in strip form. To hold the fastener against the outer face of the part 25, tabs 26, 27 are utilized which are formed from the strip body near the base of each of the bolt thread engaging tongues 12, 13, to serve as substantial flanges limiting the inward movement of the fastener relative to such part; the position of the arms of the fastener with reference to the part upon insertion of the bolt fastening and completion of the fastening operation is substantially as illustrated in Fig. 3.

The modifications of Fig. 8 to 11 inclusive may be formed from a strip provided with lateral extensions 30 which operate in the manner of substantial flanges to engage one face of the part 31 and thereby limit the inward movement of the fastener when the arms 32, 33 thereof extend through the part in applied fastening position. Each of the forms illustrated in Figs. 8 to 11 inclusive has a bolt-thread engaging portion 34 which may be yieldable, as shown in Fig. 1, or semi-rigid, as is shown in Fig. 1A, and which may be disposed adjacent the plane of the extensions 30, but in each case, the shape of the arms 32, 33 is somewhat similar. In Fig. 9, for example, the arms 32, 33, extend downwardly and inwardly, and in Fig. 10, they extend downwardly, inwardly, and thence outwardly as at 34, 35, while in Fig. 11, the arms 36, 37 extend downwardly, outwardly, and thence inwardly. In each case, the inwardly extending portions of the arms may be engaged by the bolt, and thereby forced outwardly into locking engagement with the part to be joined.

Fasteners made in accordance with the present invention may be made more economically than any expansible fastener heretofore known, inasmuch as they may be formed from a single section of sheet metal with the bolt thread engaging elements integrally provided from the blank of which the fastener is made.

A further advantage of the present invention resides in the fact that the fastener may be so designed as to engage the bolt in a manner to provide a locked, theft-proof assembly, as is desired, for example, on certain parts of motor vehicles. This is accomplished by utilizing thread engaging means which are so formed that the bolt thread is cut by the fastener as such thread engaging means are deformed into locking engagement with the bolt when fully tightened, wherefore the bolt is rendered incapable of being disengaged by a mere rotation in the reverse direction.

While this invention has been described in detail with specific examples such examples are illustrative only, since it will be apparent to those skilled in the art that other modifications within the spirit and scope of the invention may be constructed without departing from the teachings or essential characteristics thereof. The present embodiments are therefore to be considered in all respects as illustrative and not restrictive, the scope of the invention being indicated by the appended claims rather than by the foregoing description, and all changes which come within the meaning and range of equivalency of the claims are therefore intended to be embraced therein.

What is claimed is:

1. A one-piece sheet metal fastening device adapted for use with a bolt or screw threaded fastener comprising, a section of sheet metal bent to provide a bolt receiving body portion and a pair of arms extending from said body portion in the same general direction, said bolt receiving body portion being provided with integral preformed thread engaging means and substantial flange means, said arms being designed to be received in an aperture in a part to be secured with said flange means bearing thereon to limit the inward movement of the fastening device in applied fastening position, said integral preformed thread engaging means comprising substantial tongues pressed from said body portion and threadedly engaging the bolt fastener as it is advanced axially of the sheet metal fastening device to engage said arms and cause an expansion thereof into anchored engagement with said part, said preformed thread engaging means being adapted to be deformed into substantial locking engagement with the said bolt fastener in fully tightened position to prevent unscrewing and accidental removal thereof.

2. A one-piece sheet metal fastening device adapted for use with a bolt or screw threaded fastener comprising, a section of sheet metal bent to provide a pair of arms extending in the same general direction and spaced by an intermediate bolt receiving body portion, said bolt receiving body portion being provided with integral, preformed thread engaging means and substantial flange means, said arms having their free ends designed to be received in an aperture in a part to be secured with said flange means limiting the inward movement of the fastening device in applied fastening position thereon, said preformed thread engaging means comprising substantial tongues pressed from said body portion and threadedly engaging the bolt fastener as it is advanced axially to engage said arms and cause an expansion thereof into anchored engagement with said part, said thread engaging means being adapted to be deformed into substantial locking engagement with the said bolt fastener in fully tightened position to prevent unscrewing and accidental removal thereof.

3. A one-piece sheet metal fastening device adapted for use with a bolt or screw threaded fastener comprising, a section of sheet metal bent to provide a bolt receiving body portion and a pair of arms extending from said body portion in the same general direction, said bolt receiving body portion being provided with integral preformed thread engaging means and substantial flange means extending laterally of said body portion, said arms being designed to be received in an aperture in a part to be secured with said laterally extending flange means bearing thereon to limit the inward movement of the fastening device in applied fastening position, said integral preformed thread engaging means comprising substantial tongues pressed from said body portion and threadedly engaging the bolt fastener as it is advanced axially of the sheet metal fastening device to engage said arms and cause an expansion thereof into anchored engagement with said part, said thread engaging means being adapted to be deformed into substantial locking engagement with the said bolt fastener in fully tightened position to prevent unscrewing and accidental removal thereof.

4. A one-piece sheet metal fastening device adapted for use with a bolt or screw threaded fastener comprising, a section of sheet metal bent to provide a bolt receiving body portion and a pair of arms extending from said body portion in the same general direction, said bolt receiving body portion being provided with integral, preformed thread engaging means and substantial flange means comprising at least one flange element struck from the sheet metal section adjacent said body portion, said arms being designed to be received in an aperture in a part to be secured with said flange means limiting the inward movement of the fastening device in applied fastening position thereon, said preformed thread engaging means being designed to threadedly engage the bolt fastener as it is advanced axially to cause an expansion of said arms into anchored engagement with said part.

5. A one-piece sheet metal fastening device adapted for use with a bolt or screw threaded fastener comprising, a section of sheet metal bent to provide a bolt receiving body portion and a pair of arms extending from said body portion in the same general direction, said bolt receiving body portion being provided with integral, preformed thread engaging means and substantial flange means comprising elements struck from the sheet metal section adjacent said body portion to project laterally of said arms, said arms being designed to be received in an aperture in a part to be secured with said flange means limiting the inward movement of the fastening device in applied fastening position thereon, said preformed thread engaging means being adapted to threadedly engage the bolt fastener as it is advanced axially to engage said arms and cause an expansion thereof into anchored engagement with said part, said thread engaging means being adapted to be deformed into substantial locking engagement with the said bolt fastener in fully tightened position to prevent unscrewing and accidental removal thereof.

6. A one-piece sheet metal fastening device adapted for use with a bolt or screw threaded fastener comprising, a section of sheet metal bent to provide a bolt receiving body portion and a pair of arms extending from said body portion in the same general direction, said bolt receiving body portion being provided with integral, preformed thread engaging means and substantial flange means projecting laterally of said body portion, said arms having inwardly extending portions spaced apart a distance less than the thickness of the bolt shank and being designed to be received in an aperture in a part to be secured with said flange means limiting the inward movement of the fastening device in applied fastening position thereon, said preformed thread engaging means comprising substantial tongues pressed from said body portion and threadedly engaging the bolt fastener as it is advanced axially to engage said inwardly extending portions of the arms to cause an expansion of said arms into anchored engagement with said part, said thread engaging means being adapted to be deformed into substantial locking engagement with the said bolt fastener in fully tightened position to prevent unscrewing and accidental removal thereof.

7. A one-piece sheet metal fastening device adapted for use with a bolt or screw threaded fastener comprising, a section of sheet metal bent to provide a bolt receiving body portion and a pair of arms extending from said body portion in the same general direction, said bolt receiving body portion being provided with integral, preformed thread engaging means and substantial flange means comprising lateral extensions adjacent said body portion, said arms having inwardly extending portions spaced apart a distance less than the thickness of the bolt shank and being designed to be received in an aperture in a part to be secured with said flange means limiting the inward movement of the fastening device in applied fastening position thereon, said preformed thread engaging means comprising substantial tongues struck from said body portion for engaging threadedly the bolt fastener as it is advanced axially to engage said inwardly extending portions of the arms and thereby cause an expansion of said arms into anchored engagement with said part, said thread engaging means being adapted to be deformed into substantial locking engagement with the said bolt fastener in fully tightened position to prevent unscrewing and accidental removal thereof.

8. A one-piece sheet metal fastening device adapted for use with a bolt or screw threaded fastener comprising, a section of sheet metal bent to provide a bolt receiving body portion and a pair of arms extending from said body portion in the same general direction, said bolt receiving body portion being provided with integral, preformed thread engaging means and substantial flange means comprising elements struck from the sheet metal section to project laterally of said body portion, said arms having inwardly extending portions spaced apart a distance less than the thickness of the bolt shank and being designed to be received in an aperture in a part to be secured with said flange means limiting the inward movement of the fastening device in applied fastening position thereon, said preformed thread engaging means comprising substantial tongues struck from said body portion for threadedly engaging the bolt fastener as it is advanced axially to engage said inwardly extending portions of the arms and thereby cause an expansion of said arms into anchored engagement with said part, said thread engaging means being adapted to be deformed into substantial locking engagement with the said bolt fastener in fully tightened position to prevent unscrewing and accidental removal thereof.

9. A fastener having means for engaging a cooperating stud fastening device and means for attaching the fastener in an aperture in a part to be secured, said fastener comprising a sheet metal section defining a stud receiving body portion intermediate a pair of cooperating attaching elements, said body portion carrying stud engaging means and including flange means directly attached thereto adapted to overlap an edge of said aperture and engage a face of said part in attached position, said cooperating attaching elements extending from said body portion in the same general direction from one surface thereof and being adapted to enter the aperture in said part to attached position by substantial snap fastening engagement in said aperture, and means carried by at least one of said attaching elements for engaging an opposite face of said part to cooperate with said flange means on the body portion of the fastener in retaining the fastener in such attached position thereon.

10. A fastener having means for engaging a cooperating bolt or screw fastening device and means for attaching the fastener in an aperture in a part to be secured, said fastener comprising a sheet metal section defining a bolt receiving body portion intermediate a pair of cooperating attaching elements, bolt or screw thread engaging means carried by said body portion, and flange means on said body portion at either side of said thread engaging means adapted to overlap an edge of said aperture in attached position, said cooperating attaching elements extending from said body portion to project from the same surface thereof and being spaced apart to enter the aperture in said part to attached position by substantial snap fastening engagement in said aperture, and means provided on at least one of said attaching elements adapted to cooperate with said flange means on the body portion of the fastener at opposite faces of said part to retain the fastener in such attached position thereon.

11. A fastener having means for engaging a cooperating bolt or screw fastening device and means for attaching the fastener in an aperture in a part to be secured, said fastener comprising a sheet metal section defining a body portion having a bolt receiving opening intermediate a pair of cooperating attaching elements, bolt or screw thread engaging means carried by said body portion adjacent said opening, and flange means on said body portion adapted to overlap an edge of said aperture and engage a face of said part in attached position, said cooperating attaching elements extending from said body portion in the same general direction from one surface thereof and being spaced apart to enter the aperture in said part to attached position by substantial snap fastening engagement in said aperture, and means carried by at least one of said attaching elements for engaging an opposite face of said part to cooperate with said flange means on the body portion of the fastener in retaining the fastener in such attached position thereon.

GEORGE A. TINNERMAN.